United States Patent [19]
Shiotsuki et al.

[11] Patent Number: 5,291,084
[45] Date of Patent: Mar. 1, 1994

[54] STEPPING MOTOR HAVING AT LEAST ONE SET OF ASYMMETRIC STATOR POLE TEETH

[75] Inventors: Seiki Shiotsuki; Shingo Sanbe, both of Yokohama; Shinichi Kanaya; Masamichi Furukawa, both of Tokyo; Shigeru Taneichi, Yokohama, all of Japan

[73] Assignees: Canon Seiki Kabushiki Kaisha; Canon Kabushiki Kaisha, Tokyo, Japan

[21] Appl. No.: 749,539

[22] Filed: Aug. 23, 1991

[30] Foreign Application Priority Data

Aug. 27, 1990 [JP] Japan .................. 2-224852
Aug. 27, 1990 [JP] Japan .................. 2-224853

[51] Int. Cl.⁵ .................................. H02K 37/00
[52] U.S. Cl. .......................... 310/49 R; 310/257
[58] Field of Search ............... 310/49 R, 162, 163, 310/164, 263, 257, 259, 68 R

[56] References Cited

U.S. PATENT DOCUMENTS

| 3,549,918 | 12/1970 | Croymans et al. | 310/162 |
| 4,397,275 | 8/1983 | Itoh et al. | 310/49 R X |
| 4,985,669 | 1/1991 | Smith | 310/49 R |

FOREIGN PATENT DOCUMENTS

| 0309999 | 4/1989 | European Pat. Off. | |
| 1932641 | 3/1978 | Fed. Rep. of Germany | 310/49 R |
| 0035151 | 2/1986 | Japan | 310/49 R |
| 0259748 | 10/1989 | Japan | 310/49 R |
| 2211030 | 6/1989 | United Kingdom | |

OTHER PUBLICATIONS

Kaneda, et al., "Technological Trends in PM-Type Stepping Motors," Journal of Electronic Engineering, vol. 26, Jan. 1989, No. 265, Tokyo, Japan.

*Primary Examiner*—R. Skudy
*Assistant Examiner*—E. To
*Attorney, Agent, or Firm*—Fitzpatrick, Cella, Harper & Scinto

[57] ABSTRACT

A stepping motor having two stator units axially arranged. Each of the stator units includes an inner yoke and an outer yoke having a plurality of pole teeth circumferentially formed at a predetermined pitch around a rotor having magnetic poles. The outer yoke of one of the stator units is asymmetrically arranged so that the pole teeth thereof are shifted from center between the pole teeth of the inner yoke in a specific direction. As a result, a cogging torque is reduced, constant speed rotation is attained and variations in the output torque are eliminated. Variation in the generated torque are also reduced by controlling the drive pulse width, the drive voltage or the drive current during the driving operation in accordance with the number of excitation phases.

4 Claims, 8 Drawing Sheets

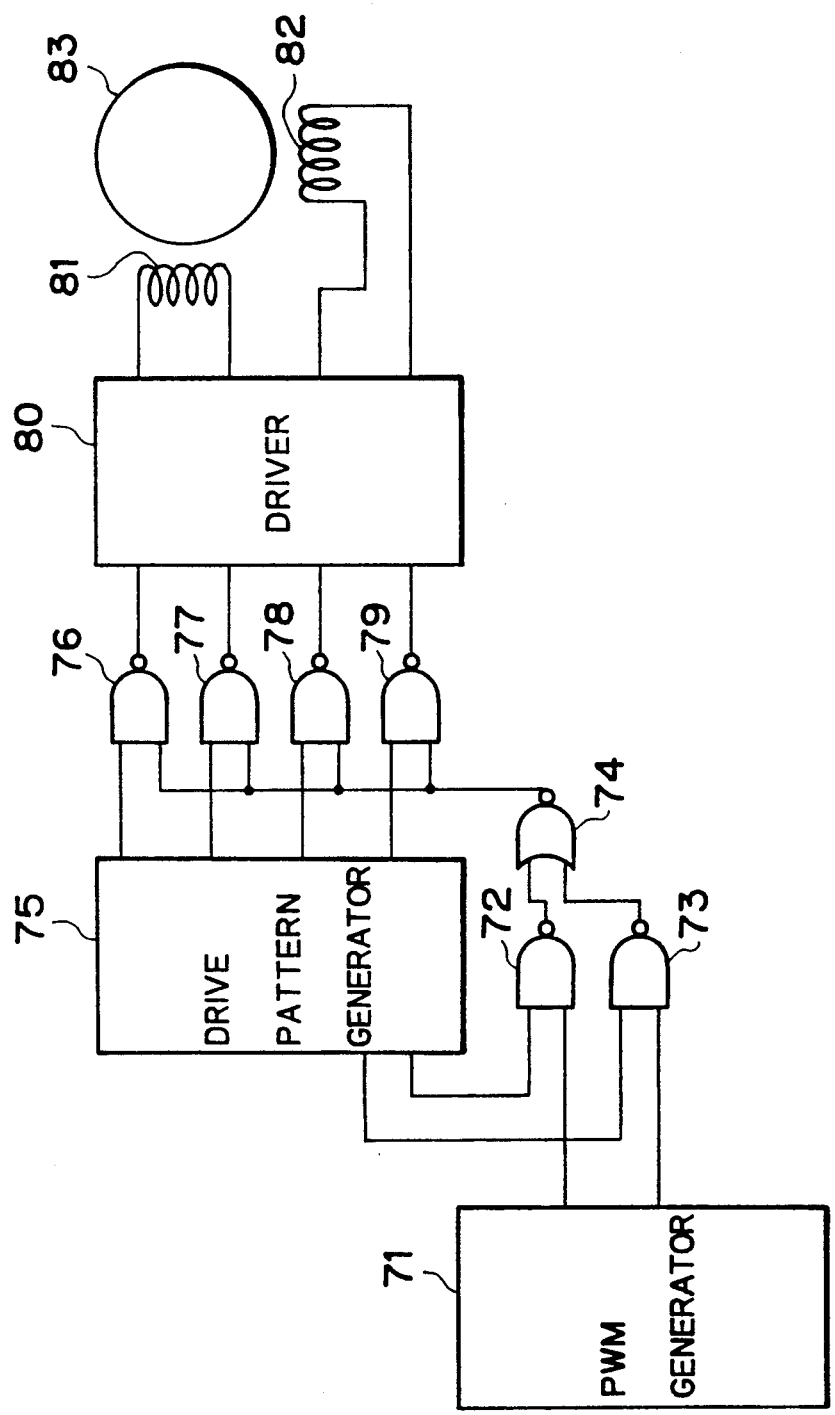
F I G. 5

5,291,084

STEPPING MOTOR HAVING AT LEAST ONE SET OF ASYMMETRIC STATOR POLE TEETH

BACKGROUND OF THE INVENTION

1. Field of the Invention

The present invention relates to a structure of a stepping motor and a method for driving a stepping motor by switching the number of excitation phases between one and two.

2. Related Background Art

In a stepping motor, a method for driving the stepping motor by switching the number of excitation phases by a drive circuit has been adopted.

In a prior art method for driving a stepping motor by switching the number of excitation phases, the generated torque varies with the number of excitation phases so that vibration and noise are generated and non-uniform rotation is caused.

In the structure of a prior art stepping motor, plural phases (normally two phases) of a stator unit comprising a yoke and a coil are axially arranged around a rotor having magnetic poles.

In such a stepping motor, it is common to axially arrange two stator units each comprising an inner yoke and an outer yoke having a plurality of magnetic teeth circumferentially formed at a constant pitch around a rotor having magnetic poles, and a coil mounted between the yokes.

In such a prior art stepping motor, the inner and outer yokes of each of the stator units are constructed such that the circumferential spacing between the magnetic teeth thereof is uniform.

In such a structure however, a variation torque or cogging torque for each step angle increases due to magnetic interference from the other adjacent stator unit. This prevents a constant speed of rotation.

Further, because of the large cogging torque, the output torque is apt to vary.

SUMMARY OF THE INVENTION

In the light of the above, it is an object of the present invention to improve a rotation precision by eliminating the variation of torque.

It is another object in the present invention to reduce ununiformity in rotational speed by controlling the drive pulse width of the motor in accordance with the number of excitation phases of the stepping motor.

It is another object of the present invention to attain a constant speed of rotation by reducing the cogging torque.

BRIEF DESCRIPTION OF THE DRAWINGS

FIG. 5 shows a drive circuit of a stepping motor of FIG. 1.

DESCRIPTION OF THE PREFERRED EMBODIMENTS

One embodiment of the present invention is now explained with reference to the drawings.

Figure 1:
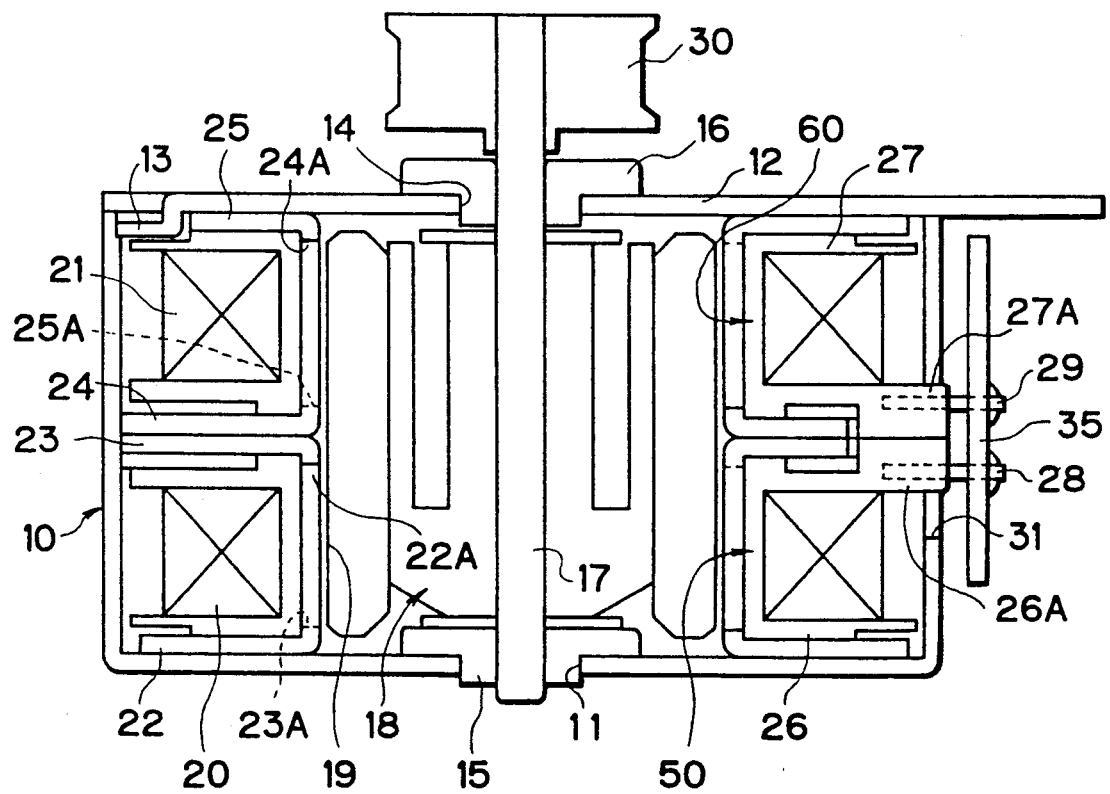
FIG. 1 shows a longitudinal sectional view of a stepping motor in accordance with one embodiment of the present invention.

FIG. 1 shows the structure of a stepping motor. In FIG. 1, a motor case 10 comprises a drawn part of end-open drum shape. An opening 11 is formed at a center of a wall end plane of the motor case 10, and a bearing 15 is secured to the opening by press fitting.

A mount plate 12 is secured to an open end plane of the motor case 10 by calking 13, and another bearing 16 is secured by press fitting to an opening 14 formed in the mount plate 12 at a center a shaft of a motor.

The mount plate 12 also serves as an end plate to close the open end plane of the motor case 10.

A motor shaft 17 is rotatably supported by the two bearings 15 and 16.

A rotor 18 is secured by press fitting to the motor shaft 17 within the motor case 10, and a rotor magnet 19, circumferentially magnetized to N and S poles at a predetermined pitch, is formed on an outer periphery of the rotor 18.

Two stator units 50 and 60 having magnetic teeth facing the rotor magnet 19 are axially arranged in the motor interior formed by the motor case 10 and the mount plate 12.

The stator units 50 and 60 have excitation coils 20 and 21 housed between inner and outer yokes having the magnetic teeth to form excitation phases of the motor. Thus, the motor shown has two excitation phases.

The excitation coil 20 and the inner and outer yokes 23 and 22 form the first phase stator unit 50, and the excitation coil 21 and the inner and outer yokes 24 and 25 form the second phase stator unit 60.

In the illustrated embodiment, the first phase outer yoke 22 is secured to the end plane of the motor case 10, and the first phase inner yoke 23 and the second phase inner yoke 24 are joined back to back, and the second phase outer yoke 25 is secured to the mount plate 12.

The first stator unit 50 is constructed by mounting the first excitation coil 20 wound on a bobbin 26 into the first inner and outer yokes 22 and 23, and the second phase stator unit 60 is constructed by mounting the second excitation coil 21 wound on a bobbin 27 into the second inner and outer yokes 24 and 25.

A plurality of magnetic teeth 22A, 23A, 24A and 25A circumferentially formed at a predetermined pitch are provided on the yokes 22, 23, 24 and 25, respectively to face the rotor magnet 19 with a predetermined gap.

Rotational force output means 30 such as a pulley is secured to an output projection of the motor shaft 17.

The bobbins 26 and 27 are made of an insulative material such as plastic, and portions 26A and 27A thereof extend from a notch 31 formed on a side plane of the motor case 10 slightly beyond the surface of the motor case. Bobbin terminals (or motor terminals) 28 and 29 on which winding ends of the excitation coils 20 and 21 are wound are embedding by embedding, to the projection.

In case of unifilar winding, two bobbin terminals are provided for each of the bobbin terminals 28 and 29, and in case of bifilar winding, three are provided.

The winding ends of the excitation coils 20 and 21 are wound on roots of the bobbin terminals 28 and 29 and are secured by soldering.

Leading ends of the bobbin terminals 28 and 29 are secured by soldering in an electrical connection manner to a circuit board 35 for connection to a motor control unit.

Figure 2:
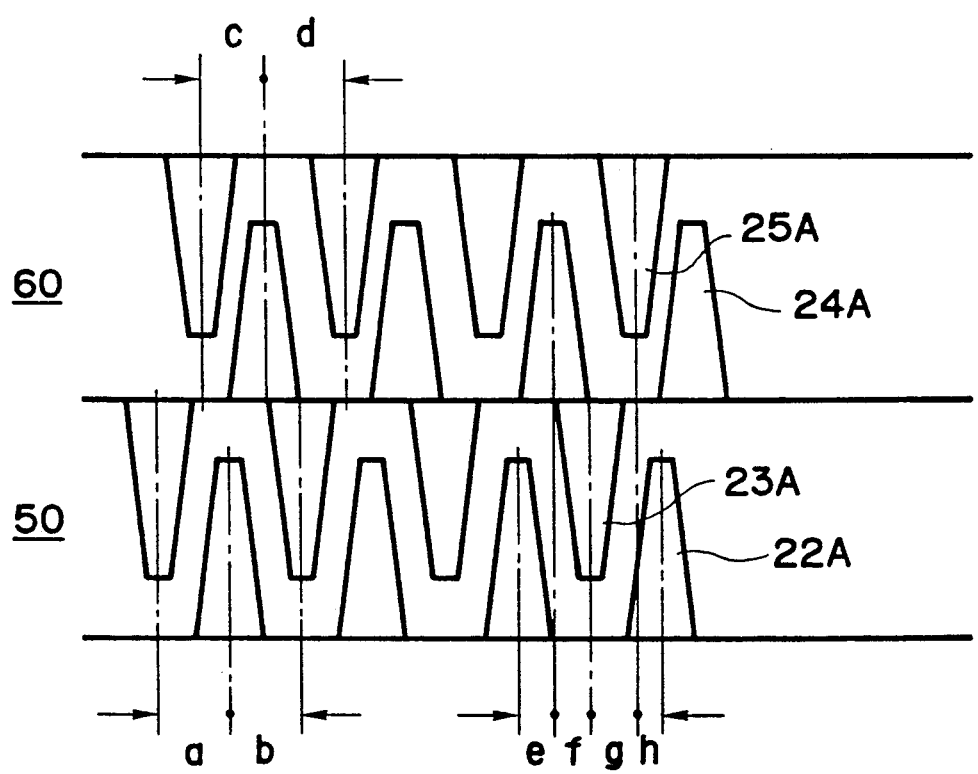
FIG. 2 shows a partial developed view of an arrangement of magnetic teeth of yokes of the stepping motor of FIG. 1.

FIG. 2 shows a partial developed view of an arrangement of pole teeth 22A~25A of the yokes 22~25.

In FIG. 2, a plurality of (for example, twelve) pole teeth 22A~25A are formed in the yokes 22~25 at a constant circumferential pitch (for example, 30 degrees for a center angle).

In assembling the motor, the first phase inner and outer yokes 22 and 23 are assembled such that the pole teeth 22A and 23A thereof are arranged in a zig-zag pattern between the pole teeth, and the second phase inner and outer yokes 24 and 25 are assembled such that the pole teeth 24A and 25A thereof are arranged in a zig-zag pattern between the pole teeth.

Thus, in the first phase stator unit 50, the pole teeth 22A and 23A of the inner and outer yokes 22 and 23 are at the centers of the spacings of the pole teeth so that they are symmetric, and in the second phase stator unit 60, the pole teeth 25A of the outer yoke 25 are shifted from the centers of the spacings of the pole teeth 24 of the inner yoke as viewed from the inner yoke 24 so that they are asymmetric.

A shift angle of the pole teeth 25A of the outer yoke 25 is set to approximately 30'~1°30'.

In FIG. 2, the following relations are met:

$$a = b \neq c \neq d \quad (1)$$

$$d > a = b > c \quad (2)$$

$$g > e = f > h \quad (3)$$

where a and b are intervals between the center of the pole teeth 22A of the outer yoke 22 in the first phase and the pole teeth 23A of the inner yoke 23 on the opposite sides of the center, c and d are intervals between the center of the pole teeth 24A of the inner yoke 24 in the second phase and the pole teeth 25A of the outer yoke 25 on the opposite sides of the center, e is the interval of the pole teeth of the first phase outer yoke 22 and the second phase inner yoke 24, f is the interval of the pole teeth of the second phase inner yoke 24 and the first phase inner yoke 23, g is the interval of the pole teeth of the first phase inner yoke 23 and the second phase outer yoke 25, and h is the interval of the pole teeth of the second phase outer yoke 25 and the first phase outer yoke 22.

As described above, in a stepping motor having two stator units axially arranged, each of the stator units comprising the inner yoke and the outer yoke having a plurality of pole teeth formed circumferentially at the predetermined pitch around the rotor 18 having magnetic poles 19, and the coil mounted between the yokes, the outer yoke 25 of one of the stator units 60 has the pole teeth 25A of the outer yoke arranged asymmetrically so that they are shifted clockwise from the centers between the pole teeth 24A of the inner yoke 24 as viewed from the inner yoke.

In the above arrangement, the shift angle of the pole teeth 25A of the outer yoke 25 is preferably approximately 30'~1°30'.

In the present embodiment, the outer yoke 25 of the second phase stator unit 60 is arranged asymmetrically. Alternatively, the outer yoke 22 of the first phase stator unit 50 may be asymmetrically arranged so that the pole teeth 22A of the outer yoke 22 are shifted clockwise from the center between the pole teeth 23A of the inner yoke 23 as viewed from the inner yoke 23.

Figure 3:
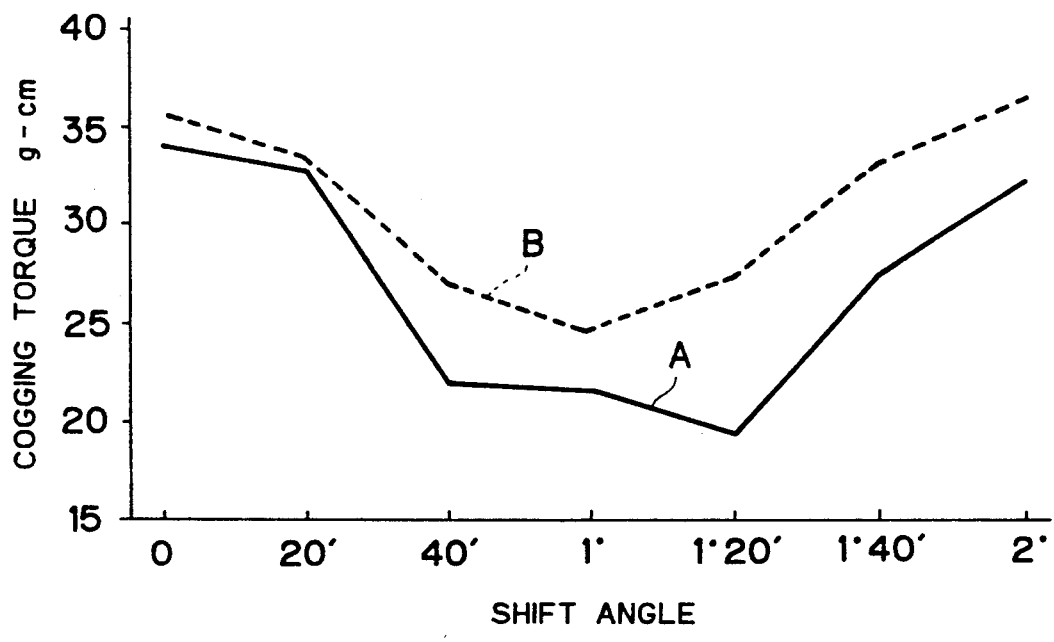
FIG. 3 shows measurements of a shift angle of an outer yoke and a cogging torque.

FIG. 3 shows a graph of measurement of a cogging torque when the second phase outer yoke 25 is shifted from the symmetric position (shift angle =0) by a predetermined angle in a specific direction (clockwise as viewed from the inner yoke).

In FIG. 3, the abscissa represents the shift angle of the outer yoke 25, the ordinate represents the cogging torque (g-cm), a curve A represents the cogging torque when the motor is driven clockwise, and a curve B represents the cogging torque when the motor is driven counterclockwise.

As seen from the graph, by arranging the outer yoke of one of the stator units shifted to the asymmetric position, the cogging torque is reduced compared to that of the symmetric arrangement (shift angle=0). Particularly when the shift angle is approximately 30'~1°30', the cogging torque can be significantly reduced.

In the present embodiment, in the stepping motor having the two stator units 50 and 60 axially arranged, the outer yoke 25 or 22 of one of the stator units is asymmetrically arranged so that the pole teeth 25A or 22A of the outer yoke are shifted clockwise from the center between the pole teeth 24A or 23A of the inner yoke 24 or 23 as viewed from the inner yoke. Accordingly, magnetic interference from the other stator unit which would be caused when the inner and outer units of the two stator units are symmetrically arranged in a prior art motor is mechanically compensated so that magnetically symmetric stator units are provided. Thus, a stepping motor having a small cogging torque and a smooth constant speed rotation is attained.

In the present embodiment, the outer yoke 25 or 22 of one of the stator units is shifted clockwise as viewed from the inner yoke 24 or 23. Depending on the status of the magnetic interference between the stator units 50 and 60, it may be asymmetrically shifted in the opposite direction to that in the present embodiment.

Namely, depending on a specific magnetic interference of the stepping motor, one of the outer yoke is shifted counterclockwise by a predetermined angle as viewed from the inner yoke so that the cogging torque may be reduced compared to that in the symmetric arrangement and the variation of the output torque can be eliminated (or reduced).

Figure 4:
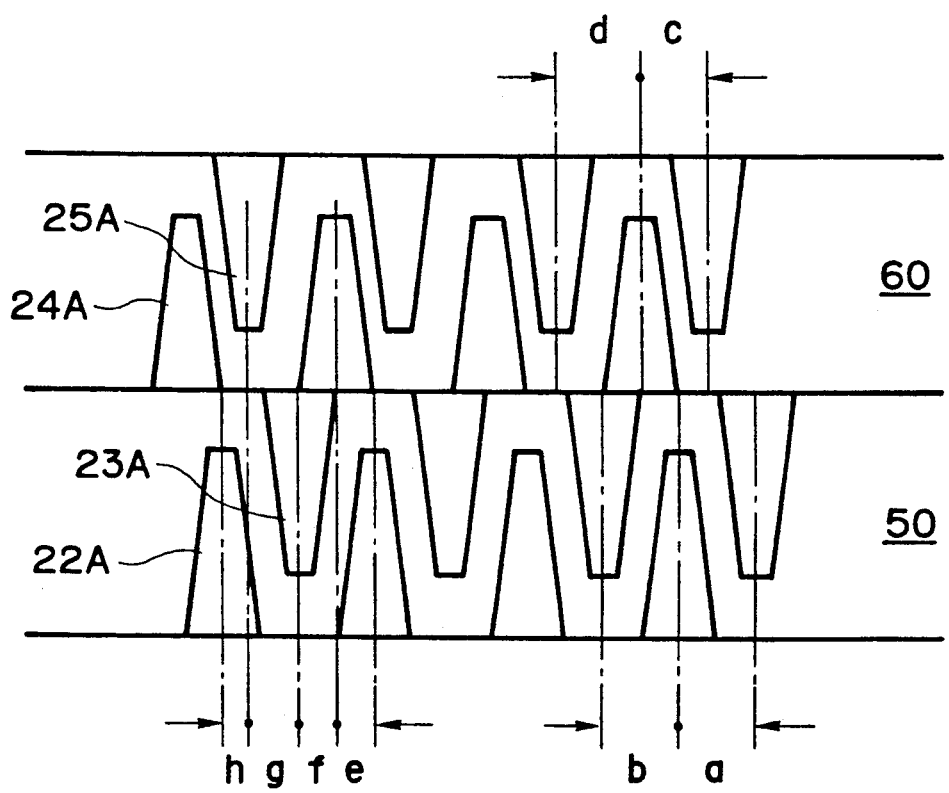
FIG. 4 shows a partial developed view of another arrangement of magnetic poles of the yokes.

FIG. 4 shows a partial developed view of an arrangement of pole teeth when the outer yoke 25 is arranged asymmetrically so that the pole teeth 25A thereof are shifted counter clockwise from the center between the pole teeth 24A of the inner yoke 24 as viewed from the inner yoke.

FIG. 4 differs from FIG. 1 only in that the pole teeth 25A are shifted from the pole teeth 24A in the opposite direction, and in other ways the construction thereof is identical.

Accordingly, the corresponding elements in FIG. 4 to those in FIG. 1 are designated by the same numerals and a detailed explanation thereof is omitted.

In the embodiment of FIG. 4, like that of FIG. 1, a stator motor which can reduce the cogging torque and eliminate (or reduce) the variation of the output torque is provided.

In accordance with the present invention, in the stepping motor having the two stator units axially arranged, each of the stator units comprising the inner yoke and the outer yoke having a plurality of pole teeth formed circumferentially at a predetermined pitch around the rotor having the magnetic poles, and the being mounted between the yokes, the outer yoke of one of the stator units is asymmetrically arranged so that the pole teeth of the outer yoke are shifted in a specific direction from the center between the pole teeth of the inner yoke. Accordingly, the stepping motor which can reduce a cogging torque, permit the constant speed of rotation and eliminate the variation of the output torque is provided.

FIG. 5 shows a drive circuit of the stepping motor shown in FIG. 1.

In FIG. 5, PWM (pulse width modulation) generator 71 generates pulse width signals of two duty factors, which are set to 30% and 40%, as will be explained later.

The pulse width signal from the PWM generator 71 is supplied to four gates 76, 77, 78 and 79 through parallel gates 72 and 73 and a serial gate 74.

The gates 72 and 73 switch the PWM value for one-phase excitation and the PWM for two-phase excitation by a pattern signal from a drive pattern generator 75.

In the present embodiment, the PWM generator 71 uses a pulse source of a carrier frequency of 20 KHz and it generates two pulse signals, one having a 30% duty factor for driving the motor by a pulse width equal to 30% of a period (a reciprocal of a frequency) and the other having a 40% duty factor for driving the motor by a pulse width equal to 40%. In the one-phase excitation mode, the PWM value is switched to the 40% duty factor, and in the two-phase excitation mode, the PWM value is switched to the 30% duty factor by the gates 72 and 73.

The pattern signal from the drive pattern generator 75 is also supplied to second input terminals of the four gates 76~79.

The drive pulse signal of the frequency switched in accordance with the number of excitation phases is supplied to a motor driver 80 from the four gates 76~79.

A motor such as a stepping motor to be driven is constructed such that a rotor 83 on a motor shaft is rotated when two coils 81 and 82 which form two excitation phases are energized.

Figure 6:
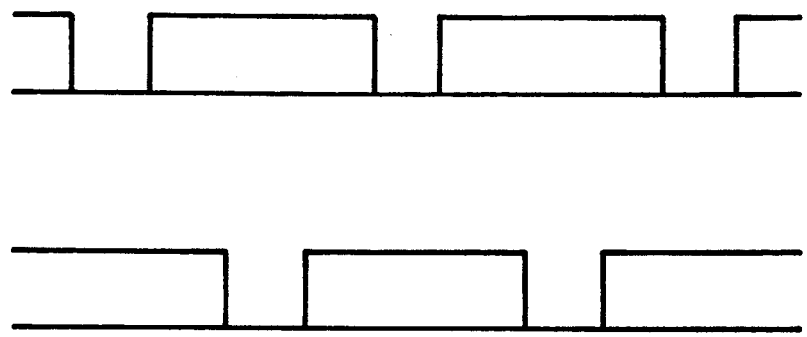
FIG. 6 shows waveforms of drive voltages applied to excitation coils by the drive circuit of FIG. 5.

When the coils 81 and 82 are to be energized in the one-phase excitation mode, the driver 80 drives the motor in accordance with the 40% duty factor pulse, and when they are to be energized in the two-phase excitation mode, it drives by the 30% duty factor pulse FIG. 6 shows waveforms of drive voltages applied to the excitation coils 81 and 82 when the motor is driven in the 1-2 phase excitation or halfstep excitation mode.

Figure 8:
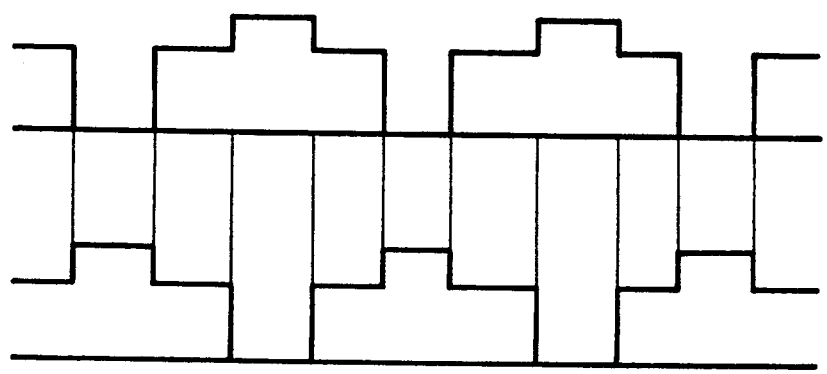
FIG. 8 shows waveforms of voltages applied to excitation coils when the stepping motor shown in FIG. 7 is half-step driven.

In FIG. 8, the 40% duty factor pulse is applied in the one-phase excitation mode in which one of the coils 81 and 82 is energized, and the 30% duty factor pulse is applied in the two-phase excitation mode in which both coils 81 and 82 are energized.

A torque generated by the motor is proportional to a time integration of an applied voltage (or current), and when a motor such as a stepping motor is driven by a constant voltage, the generated torque (combined torque) in the two-phase excitation mode is $\sqrt{2}$ times as high as that in the one-phase excitation mode.

Accordingly, assuming that a torque $T_1$ generated in the one-phase excitation mode is $0.4 \times K_1 ZI$, a torque $T_2$ generated in the two-phase excitation mode is equal to $0.3 \times \sqrt{2} \times K_1 ZI$.

Since $0.3 \times \sqrt{2} = 0.4$, the generated torques $T_1$ and $T_2$ in the respective modes are substantially equal and the torques generated by the motor can be generally unified.

In the present embodiment, the uniformity in the rotation of the motor and the vibration and the noise can be effectively reduced.

A reduction in of approximately 2~3 dB was attained with the present invention.

Figure 7:
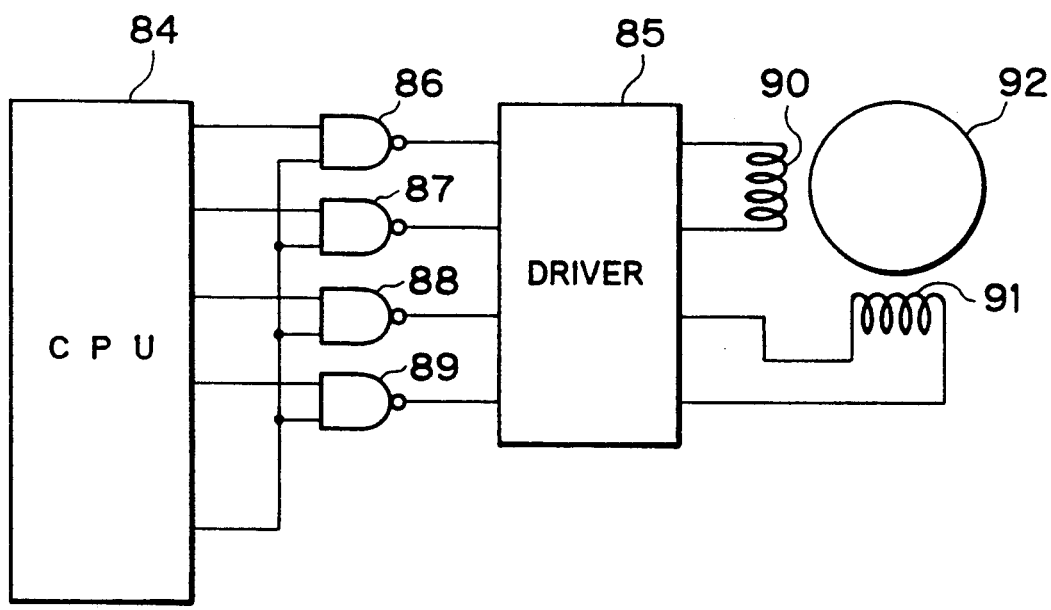
FIG. 7 shows another drive circuit.

Another drive circuit which is suitable to implement the method for driving the motor of the present invention is shown in FIG. 7.

In the drive circuit of FIG. 7, the drive pattern generator 75 and the PWM generator 1 of FIG. 5 have been substituted by one CPU 84.

In FIG. 7, the duty factor of the pulse width for driving the motor is changed by software (control circuit) in the CPU 84.

The CPU 84 has the control circuit which switches the pulse width for driving the motor between two duty factors, that is, 30% duty factor and 40% duty factor in accordance with the number of excitation phases.

The CPU 84 also has a control circuit for the drive pattern of the motor.

The CPU 84 selects the 40% duty factor for the PWM to be applied in the one-phase excitation mode, and the 30% duty factor for the PWM to be applied in the two-phase excitation mode, in accordance with the pattern signal from the drive pattern control circuit.

The PWM value from the CPU 84 is supplied to four gates 86, 87, 88 and 89, and outputs of those four gates are supplied to a motor driver 85.

A motor such as a stepping motor is constructed such that a rotor 92 on a motor shaft is rotated when coils 90 and 91 of the two excitation phases are energized.

Thus, when the coils 90 and 91 are to be energized a one-phase excitation mode, the driver 85 drives the motor in accordance with 40% duty factor pulse width, and when they are to be energized in the two-phase excitation mode, it drives the motor in accordance with the 30% duty factor pulse width.

Accordingly, like in the previous embodiment, the coils 90 and 91 are driven by the voltage waveform shown in FIG. 6, the torque $T_1$ generated in the one-phase excitation mode is equal to $0.4 \times K_1 ZI$, and the torque $T_2$ generated in the two-phase excitation mode is equal to $0.3 \times \sqrt{2} \times K_1 ZI$. Accordingly, the torques generated in the respective modes are unified.

Accordingly, like the drive circuit of FIG. 5, the drive circuit of FIG. 7 can unify the torques generated by the motor so that the method for driving the motor, which can reduce the non-uniformity in the rotation and reduce the vibration and noise, is attained.

In the present embodiment, the value of the PWM is changed for each mode to unify the generated torques. Alternatively, the same unification of the generated torques can be attained by changing the drive voltage or the drive current for each mode and the same effect as that of the present embodiment is attained.

FIG. 8 shows waveforms of drive voltage (or current) applied to the excitation coils when the motor is driven in the 1-2 phase or half-step excitation mode.

In FIG. 8, where a voltage of 40 volts is applied in the one-phase excitation mode in which one of the coils is energized, a voltage of 30 volts is applied in the two-phase excitation mode in which both coils are energized.

The torque generated by the motor is proportional to a time integration of an applied voltage (or current). When a motor such as a stepping motor is driven by a constant voltage, the torque (combined torque) generated in the two-phase excitation mode is $\sqrt{2}$ times as high as that in the one-phase excitation mode. Thus, assuming that the torque $T_1$ generated in the one-phase excitation mode is $0.4 \times K_1 ZI$, the torque $T_2$ generated in the two-phase excitation mode is equal to $0.3 \times \sqrt{2} \times K_1 ZI$. Thus, the torques $T_1$ and $T_2$ generated in the respective modes are substantially equal.

Accordingly, like in the previous embodiment, the torques generated by the motor are substantially unified and the non-uniformity in the rotation is eliminated and the vibration and noise are reduced.

Figure 9:
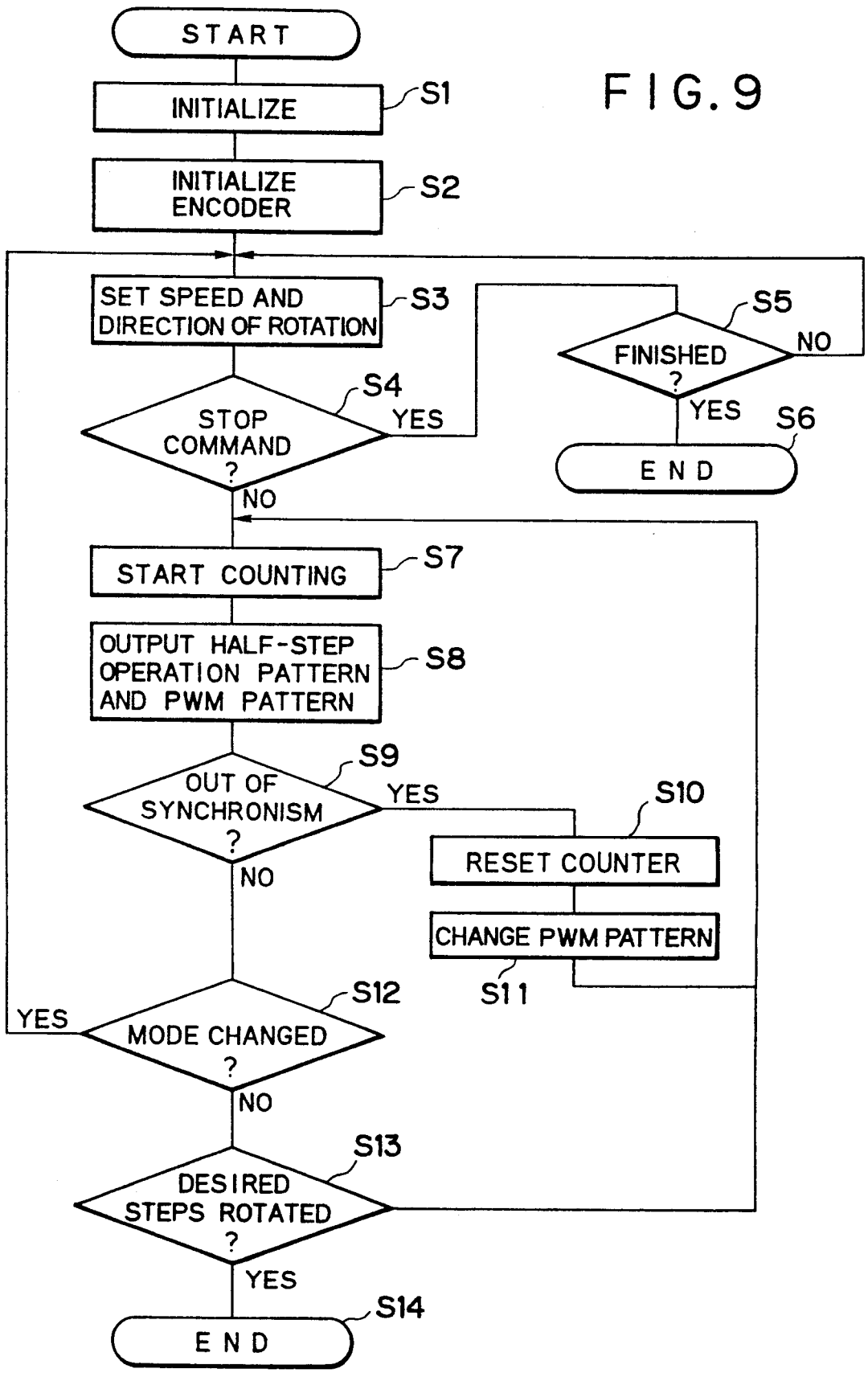
FIG. 9 shows a flow chart of a sequence of control process when a method for driving the motor shown in FIG. 7 is implemented.

FIG. 9 shows a flow chart of a sequence of control in the implementation of the method for driving the motor of the present invention by controlling the PWM value in the half-step excitation mode in the 1-2 phase excitation mode.

In FIG. 9, when the drive of the motor is started, the control system is initialized in a step S1. In a step S2, an encoder for detecting a rotational angle of the motor is initialized.

In a step S3, the direction and the speed of the rotation of the motor are set. In a step S4, whether a stop of the drive command has been issued or not is checked.

If the stop of the drive command has been issued, the process proceeds to a step S5 to determine whether the drive is to be terminated or not. If the drive is not to be terminated, the process returns to the step S3 to repeat the above steps.

If the drive is to be terminated in the step S5, the process proceeds to a step S6 to terminate the control process.

If the stop of drive command has not been issued in the step S4, the counting by the encoder is started in a step S7. In a step S8, the 1-2 phase excitation drive pattern and the drive pulse PWM pattern are outputted.

As the drive is started, whether the motor rotation is out of synchronization or not is determined in a step S9.

If it is out of synchronization, the process proceeds to a step S10 to reset the count of the encoder. In a step S11, the PWM pattern is changed. Then, the process returns to the step S7 to repeat the subsequent steps.

If the out-of-synchronization state is not detected in the step S9, the process proceeds to a step S12 to determine whether the motor drive mode has been changed or not.

If it has been changed, the process returns to the step S3 to repeat the above steps.

If the drive mode has not been changed in the step S12, the process proceeds to a step S13 to determine whether the motor has been rotated by a predetermined number of steps.

If it has not yet been so rotated, the process returns to the step S7 to repeat the subsequent steps.

If it has been so rotated, the process proceeds to a step S14 to terminate the drive of the motor.

In the above embodiments, the present invention is applied to the 1-2 phase excitation drive method although the present invention is equally applicable to other drive methods in which the number of excitation phases is switched, such as a 1-1 phase excitation or a 1-2-1 phase excitation, and similar effect may be attained.

In accordance with the present invention, in the method for driving the motor by switching the number of excitation phases with the motor drive circuit, the drive pulse width, the drive voltage or the drive current is controlled during the driving operation in accordance with the number of excitation phases. Accordingly, the variation in the generated torque is reduced, the non-uniformity in the rotation is reduced, and the vibration and noise are reduced.

What is claimed is:

1. A stepping motor comprising:
   a rotor having magnetic poles;
   an inner yoke having a plurality of pole teeth circumferentially formed at a predetermined pitch around said rotor;
   an outer yoke having a plurality of pole teeth circumferentially formed at a predetermined pitch around said rotor;
   the pole teeth of said outer yoke being located in a center position between the pole teeth of said inner yoke, respectively;
   a coil mounted between said inner yoke and said outer yoke;
   a first stator unit including said inner yoke, said outer yoke and said coil;
   a second stator unit including inner and outer yokes each having a plurality of pole teeth circumferentially formed at a predetermined pitch around said rotor and a coil mounted between said inner and outer yokes axially arranged with said first stator unit, the pole teeth of said outer yoke of said second stator unit are, respectively, in a shifted position from a center position between the pole teeth of said inner yoke of said second stator unit in a specific direction;
   the pole teeth of said inner yoke of said second stator unit being located in a middle position between the pole teeth of said outer yoke of said first stator unit and the pole teeth of said inner yoke of said first stator unit; and
   the pole teeth of said outer yoke of said second stator unit being located in a shifted position from a middle position between the pole teeth of said inner yoke of said first stator unit and the pole teeth of said outer yoke of said first stator unit.

2. A stepping motor according to claim 1, wherein a shifted angle of each of the pole teeth of said outer yoke of said second stator unit relative to the respective central positions between the pole teeth of said inner yoke of said second stator unit, is in a range from 30' to 1°30'.

3. A stepping motor according to claim 1, wherein said first and second stator units comprise a number of excitation phases, said motor further comprising:
   a drive circuit for driving said stepping motor; and
   a control circuit for controlling a drive pulse width of a drive pulse of said drive circuit in accordance with the number of excitation phases of said first and second stator units.

4. A stepping motor according to claim 3 wherein said control circuit sets a duty factor of the drive pulse to 30% in a two-phase excitation mode and to 40% in a one-phase excitation mode.

* * * * *

UNITED STATES PATENT AND TRADEMARK OFFICE
CERTIFICATE OF CORRECTION

PATENT NO. : 5,291,084
DATED : March 1, 1994
INVENTOR(S) : SEIKI SHIOTSUKI, ET AL.

Page 1 of 2

It is certified that error appears in the above-indentified patent and that said Letters Patent is hereby corrected as shown below:

Title page, item
[57] Abstract
    Line 1, "having" should read --has--.
    Line 11, "Variation" should read --Variations--.

COLUMN 1
    Line 19, "is caused." should read --occurs.--.
    Line 34, "structure" should read --structure,--.
    Line 43, "a" should be deleted.
    Line 44, "of" should read --in the--.
    Line 45, "in" should read --of--.
    Line 46, "ununiformity" should read --non-uniformity--.

COLUMN 2
    Line 21, "center a" should read --center of a--.
    Line 67, "are embedding" should read --are secured,--.

COLUMN 4
    Line 18, "a" should read --the--.
    Line 19, "a" should read --the--.
    Line 38, "compensated" should read --compensated for--.

COLUMN 5
    Line 10, "the being" should read --being--.
    Line 57, "by" should read --the motor in accordance
        with--; and "pulse" should read --pulse.--.

UNITED STATES PATENT AND TRADEMARK OFFICE
CERTIFICATE OF CORRECTION

PATENT NO. : 5,291,084
DATED : March 1, 1994
INVENTOR(S) : SEIKI SHIOTSUKI, ET AL.

It is certified that error appears in the above-indentified patent and that said Letters Patent is hereby corrected as shown below:

<u>COLUMN 6</u>
　　Line 12, "uniformity" should read --non-uniformity--.
　　Line 15, "in" should read --in motor noise--.
　　Line 46, "with" should read --with the--.

<u>COLUMN 7</u>
　　Line 27, "mode" should read --mode or--.

<u>COLUMN 8</u>
　　Line 64, "claim 4" should read --claim 3,--.

Signed and Sealed this

Thirtieth Day of August, 1994

Attest:

BRUCE LEHMAN

*Attesting Officer*　　　*Commissioner of Patents and Trademarks*